(12) United States Patent
Weirauch et al.

(10) Patent No.: US 7,657,943 B2
(45) Date of Patent: Feb. 2, 2010

(54) DATA STRUCTURE FOR CONTROL INFORMATION ON REWRITEABLE DATA STORAGE MEDIA

(75) Inventors: Charles R Weirauch, Loveland, CO (US); Joel B Larner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 11/049,262

(22) Filed: Feb. 1, 2005

(65) Prior Publication Data

US 2005/0135226 A1 Jun. 23, 2005

Related U.S. Application Data

(62) Division of application No. 09/921,024, filed on Aug. 2, 2001, now abandoned, which is a division of application No. 09/301,880, filed on Apr. 29, 1999, now Pat. No. 6,330,210.

(51) Int. Cl.
*G06F 7/22* (2006.01)
*G06F 21/00* (2006.01)
(52) U.S. Cl. .................... 726/27; 369/275.2; 369/275.1
(58) Field of Classification Search .............. 369/272.1, 369/275.1, 275.2, 275.3; 726/27, 30
See application file for complete search history.

(56) References Cited

U.S. PATENT DOCUMENTS

| 4,707,750 | A |   | 11/1987 | Anderson et al. |
|---|---|---|---|---|
| 4,827,462 | A | * | 5/1989 | Flannagan et al. ....... 369/30.09 |
| 4,989,195 | A |   | 1/1991 | Suzuki |
| 5,170,385 | A |   | 12/1992 | Senshu et al. |
| 5,173,886 | A |   | 12/1992 | Satoh et al. |
| 5,214,627 | A |   | 5/1993 | Nakashima et al. |
| 5,233,576 | A | * | 8/1993 | Curtis et al. ............. 369/13.02 |
| 5,237,553 | A |   | 8/1993 | Fukushima et al. |
| 5,239,382 | A |   | 8/1993 | Hatakenaka et al. |
| 5,247,494 | A |   | 9/1993 | Ohno et al. |
| 5,258,876 | A |   | 11/1993 | Danner et al. |
| 5,265,230 | A |   | 11/1993 | Saldanha et al. |
| 5,337,197 | A |   | 8/1994 | Brown et al. |
| 5,446,724 | A |   | 8/1995 | Tabe et al. |

(Continued)

FOREIGN PATENT DOCUMENTS

EP 0 299 742 A2 1/1989

(Continued)

OTHER PUBLICATIONS

Office Action dated Dec. 20, 2007, U.S. Appl. No. 11/049,333, filed Feb. 1, 2005.

(Continued)

*Primary Examiner*—Jung Kim
*Assistant Examiner*—I. O.

(57) ABSTRACT

A data storage medium includes a data structure, called a disk control block, used for administration and control information for the data storage medium. One medium may contain multiple different disk control blocks, each addressing a different function. Each disk control block includes a control block identifier that specifies the function of the disk control block. Each control block also includes a set of standard access control parameters. If a drive encounters an unrecognized disk control block, the drive can still decode the standard control parameters, so that the drive behavior is not inconsistent with the requirements of the unrecognized disk control block.

8 Claims, 5 Drawing Sheets

U.S. PATENT DOCUMENTS

| | | | |
|---|---|---|---|
| 5,537,636 | A | 7/1996 | Uchida et al. |
| 5,568,467 | A | 10/1996 | Inagaki |
| 5,592,452 | A | 1/1997 | Yoshimoto et al. |
| 5,617,407 | A | 4/1997 | Bareis |
| 5,644,444 | A | 7/1997 | Braithwaite et al. |
| 5,684,785 | A | 11/1997 | Itami et al. |
| 5,752,009 | A | 5/1998 | Nakahara |
| 5,805,564 | A | 9/1998 | Kobayashi et al. |
| 5,940,854 | A | 8/1999 | Green et al. |
| 6,130,867 | A | 10/2000 | Ishida et al. |
| 6,137,769 | A * | 10/2000 | Sawada et al. ............ 369/275.3 |
| 6,201,784 | B1 | 3/2001 | Maeda |
| 6,330,210 | B1 * | 12/2001 | Weirauch et al. ......... 369/30.11 |
| 6,385,744 | B1 | 5/2002 | Ando et al. |
| 7,082,092 | B2 | 7/2006 | Weijenbergh et al. |
| 2005/0025037 | A1 | 2/2005 | Weirauch |

FOREIGN PATENT DOCUMENTS

| | | | |
|---|---|---|---|
| EP | 0 342 748 A | 11/1989 | |
| EP | 0 929 072 A | 7/1999 | |

OTHER PUBLICATIONS

Final Office Action dated May 1, 2008, U.S. Appl. No. 11/049,333, filed Feb. 1, 2005.

European Search Report dated Dec. 21, 2007, EP App. No. EP 07 07 5355.

Office Action dated Apr. 1, 2009, U.S. Appl. No. 11/560,315, filed Nov. 15, 2006.

Office Action dated Apr. 28, 2003, U.S. Appl. No. 09/921,024, filed Aug. 2, 2001.

Office Action dated May 31, 2002, U.S. Appl. No. 09/921,024, filed Aug. 2, 2001.

Office Action dated Nov. 8, 2002, U.S. Appl. No. 09/921,024, filed Aug. 2, 2001.

Office Action dated Oct. 10, 2003, U.S. Appl. No. 09/921,024, filed Aug. 2, 2001.

Final Office Action dated May 12, 2005, U.S. Appl. No. 09/921,024, filed Aug. 2, 2001.

Office Action dated Apr. 9, 2004, U.S. Appl. No. 09/921,024, filed Aug. 2, 2001.

Office Action dated Oct. 4, 2005, Jap. Pat. App. No. 2000-120,611.

Office Action dated Oct. 29, 2002, EP App. No. 00 303 013.7.

Office Action dated Jun. 30, 2003, EP App. No. 00 303 013.7.

Office Action dated Oct. 8, 2004, EP App. No. 03 075 942.7.

Office Action dated Nov. 18, 2008, EP App. No. 07 075 355.3.

* cited by examiner

DATA STRUCTURE FOR CONTROL INFORMATION ON REWRITEABLE DATA STORAGE MEDIA

CROSS-REFERENCE TO RELATED APPLICATIONS

The present application is a divisional application of Ser. No. 09/921,024 filed on Aug. 2, 2001 now abandoned. Application Ser. No. 09/921,024 is hereby incorporated herein by reference. Application Ser. No. 09/921,024 is a divisional application of Ser. No. 09/301,880 filed on Apr. 29, 1999 now issued as U.S. Pat. No. 6,330,210. Application Ser. No. 09/301,880 is hereby incorporated herein by reference.

FIELD OF INVENTION

This invention relates generally to data storage media and more specifically to data structures used for various identification and control attributes for a rewriteable medium.

BACKGROUND OF THE INVENTION

A data storage medium typically includes an area for storage of various administration and control information, such as an identification of the medium, perhaps information regarding how the medium is partitioned into various separate sections, a directory or table of file names and dates, and perhaps information regarding access control. Administration and control information may reside in a particular physical location on a medium separate from a general data storage area. For example, compact discs (CD) used for data storage have a single spiral track, with an area near the start of the track called a lead-in area, and an area near the end of the track called a lead-out area. The information in the lead-in area and the lead-out area contains administration and control information used only by drives and operating systems, and is separate from the area used for data storage.

Sometimes, a data storage medium has a format that is specific to a proprietary drive mechanism, or specific to one computer operating system. Alternatively, some formats are defined by standards, so that a medium can be exchanged among drives from multiple manufacturers and may be used by multiple computer operating systems. Standards are useful in eliminating unnecessary variation, but standards may also inhibit change, even when change is needed. For example, CD's were originally developed for read-only digital audio. As the CD technology was extended to general data, and write-once media, and rewriteable media, accommodation of new features with backwards compatibility was always an issue. There is a need for a standard way of recording administration and control information, for interchangeable rewriteable media, that can accommodate unforseen needs for changes in the future.

SUMMARY OF THE INVENTION

One goal of the invention is to provide a standard, but very general and flexible, data structure for recording administration and control information for a rewriteable storage medium, particularly when drives and media may be provided by many different manufacturers. Accordingly, a data structure, called a Disk Control Block (DCB), is defined. One medium may contain multiple different DCB's, each addressing a different function. Several examples of DCB's are provided. One example is called a General Media (GM) DCB. The GM DCB contains information such as a counter that counts how many times the medium has been loaded, control information for formatting of the medium by the drive, and power calibration information. Another example DCB is called an Access Control (AC) DCB. An AC DCB may be used to partition a disk into multiple sections, and for each section the DCB defines an access attribute such as write-once, or read only with password, or other similar access control. Another example is a DCB for updating firmware.

Another goal of the invention is to provide a data structure such that if a drive encounters an unrecognized DCB, the drive can still decode an essential set of standard control parameters in the unrecognized DCB, so that the drive behavior is not inconsistent with the requirements of the unrecognized DCB. Each DCB includes a control block identifier that specifies the function of the DCB. Each DCB also includes an area called Unknown Content Descriptor Actions (UCDA), which specifies certain actions a drive must take if the drive does not recognize the identifier for the DCB.

An additional goal of the invention is to ensure the reliability of DCB's even if the disk is defective, or even if power is interrupted during writing of a DCB. In an example embodiment, redundant DCB's are provided, and each DCB has a sequence number. Identical identifiers with identical sequence numbers indicate identical (deliberately redundant) DCB's. If one copy is invalid, the invalid copy is replaced by the valid copy. Identical identifiers with different sequence numbers indicate that writing of a DCB was interrupted, and the DCB having the oldest (lowest) sequence number, for the particular identifier, is used.

DETAILED DESCRIPTION OF THE PREFERRED EMBODIMENT OF THE INVENTION

In the following discussion, a proposed standard for optical disk media is used to illustrate a specific example embodiment of the invention. However, the invention is equally applicable to any interchangeable rewriteable data storage medium. For example, the invention is equally applicable to tapes, removable magnetic disks or cards, or removable semiconductor memory.

The proposed standard specifies a rewriteable interchangeable optical disk. A data structure called a Disk Control Block (DCB) is defined. There may be many types of DCB's; some may be defined by the proposed standard, and others may be defined by individual manufacturers. One type of DCB, called a General Media (GM) DCB is defined by the proposed standard. The proposed standard specifies that every compatible medium must write one GM-DCB. All other types of DCB's are optional, and are in addition to the GM-DCB.

The proposed optical disk medium is formatted into sectors, and sectors are logically grouped into blocks. In the proposed standard, each sector is 2 Kbytes (2,048 bytes) and each block is 16 sectors. A block is the smallest unit of data that can be written. Error correction is performed on a block by block basis. In the proposed standard, a DCB is one block. In the specific example embodiment, DCB's reside within the lead-in and lead-out areas of an optical disk.

Figure 1:
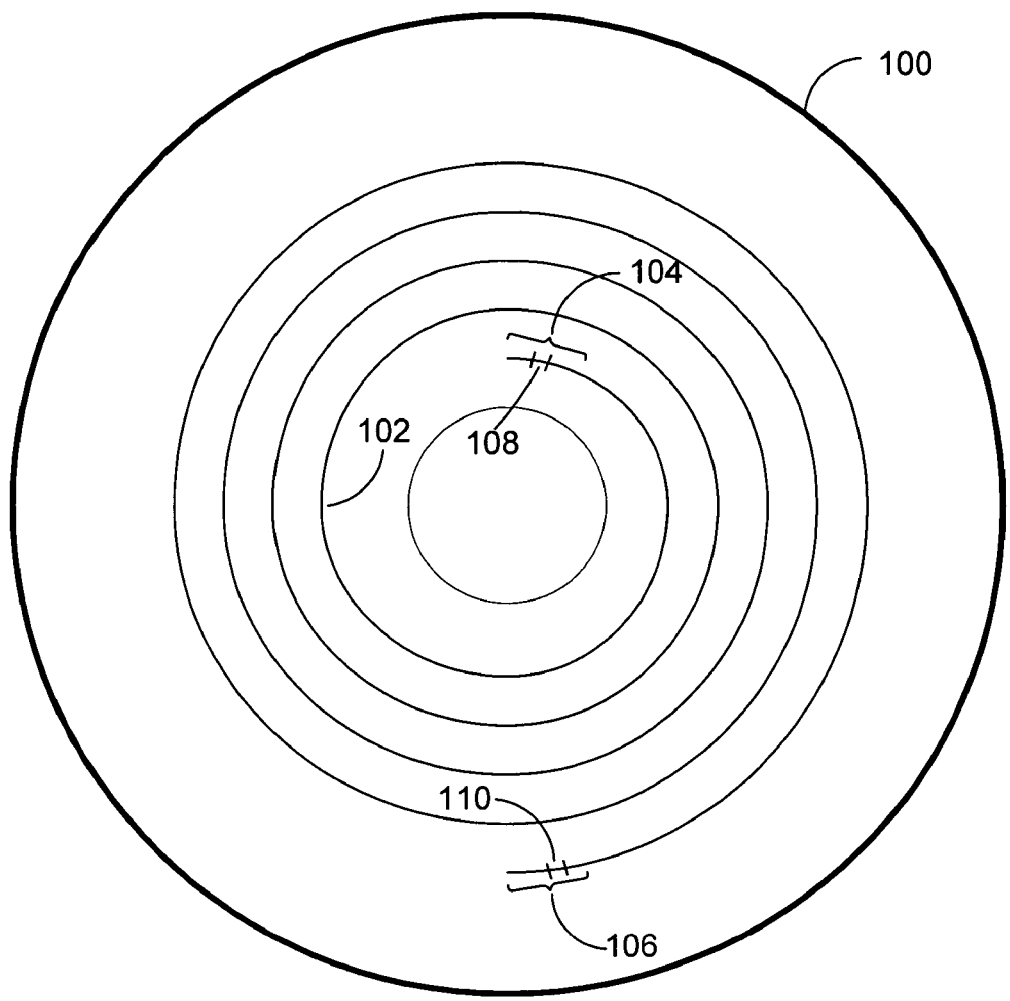
FIG. 1 is a plan view of an optical disk in accordance with the invention.

FIG. 1 illustrates the proposed disk medium. The proposed disk 100 has a single spiral track 102, starting at an inner diameter and ending at an outer diameter. The spiral track has at least one lead-in area 104 and at least one lead-out area 106. One copy (108) of each DCB is written in the lead-in area, and a redundant copy (110) is written in the lead-out area. In the proposed standard, each lead-in or lead-out area can accommodate up to 16 different DCB's (although there may be many more than 16 DCB's defined). The GM DCB is written when the disk is first formatted, and all other DCB's may be appended at a later time.

Figure 2:
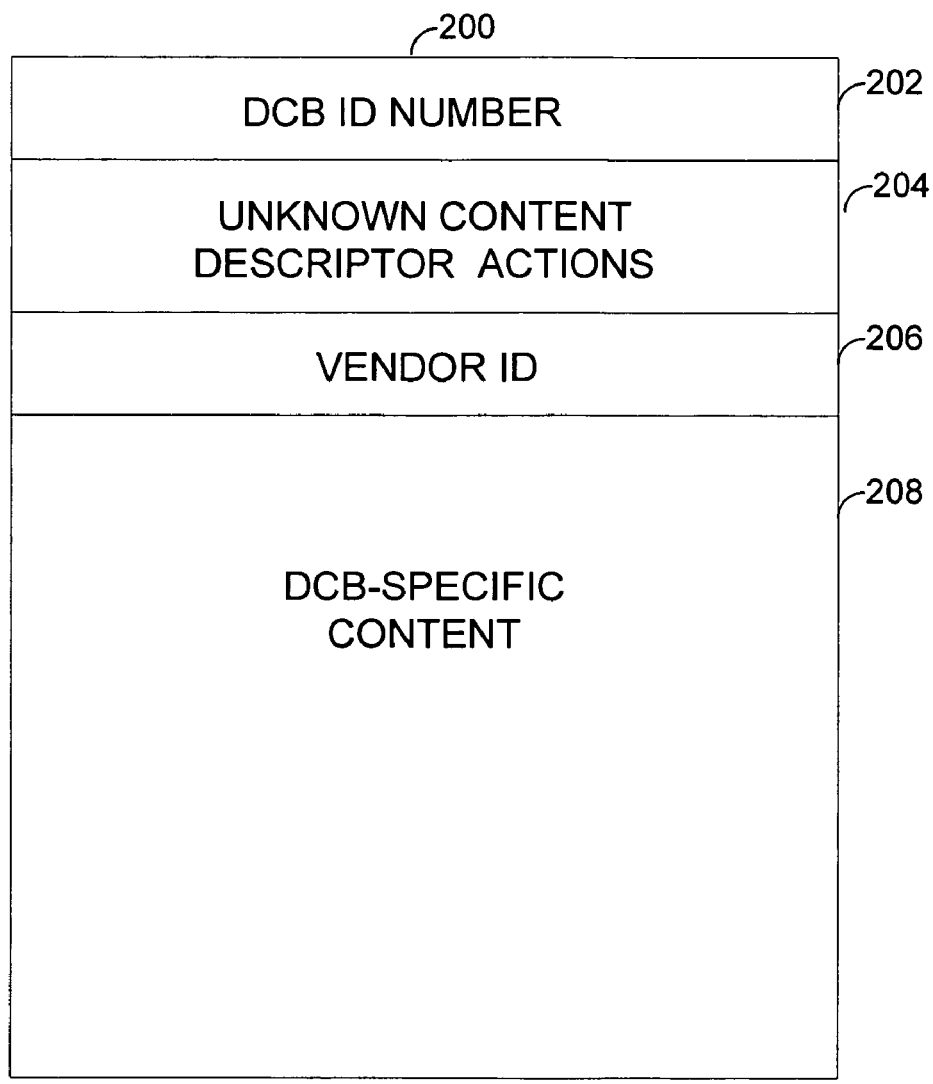
FIG. 2 is a block diagram of a Disk Control Block in accordance with the invention.

FIG. 2 illustrates a DCB 200 in accordance with the invention. The proposed standard specifies a standard header. The header contains three information items: (1) a DCB ID number (202), (2) an Unknown Content Descriptor Actions (UCDA) area (204), and (3) a vendor ID (206). The remaining part 208 of the DCB is specific to the type of DCB identified by the DCB ID number. The DCB ID number is a number that must be registered as part of the standard. However, as will be discussed in more detail below, new DCB ID's may be added during the life of the standard, and it is not necessary for every drive to recognize every DCB ID. The proposed standard reserves one 16-bit word for the DCB ID. The proposed standard specifies that all DCB blocks are initially formatted as all zeros. Therefore, a DCB ID of 0000 hex indicates an unused (available) block. If a drive is unable to write a DCB, for example because of a media defect, the DCB ID is set to all ones (FFFF hex). If a DCB is no longer needed, rather than rewriting the block with all zeros, the DCB ID is set to FFFE hex, which indicates the block is available for reuse. Note that because of possible media defects, the sequence of DCB's in the lead-in area may be different than the sequence of DCB's in the lead-out area. For example, if the first DCB block of the lead-in area is defective, the GM DCB may be the second block in the lead-in area but may be the first block in the lead-out area.

One important feature of a DCB is the second header entry, Unknown Content Descriptor Actions (UCDA) 204. The UCDA is used to ensure that even if a drive does not recognize a DCB ID, the drive does not permit disk access actions that are inconsistent with the access control requirements of the unknown DCB. This provides some backwards compatibility, a capability that is lacking in many current proposed standards. The UCDA will be discussed in more detail below. The third and final entry in DCB header is a vendor ID (206).

Figure 3:
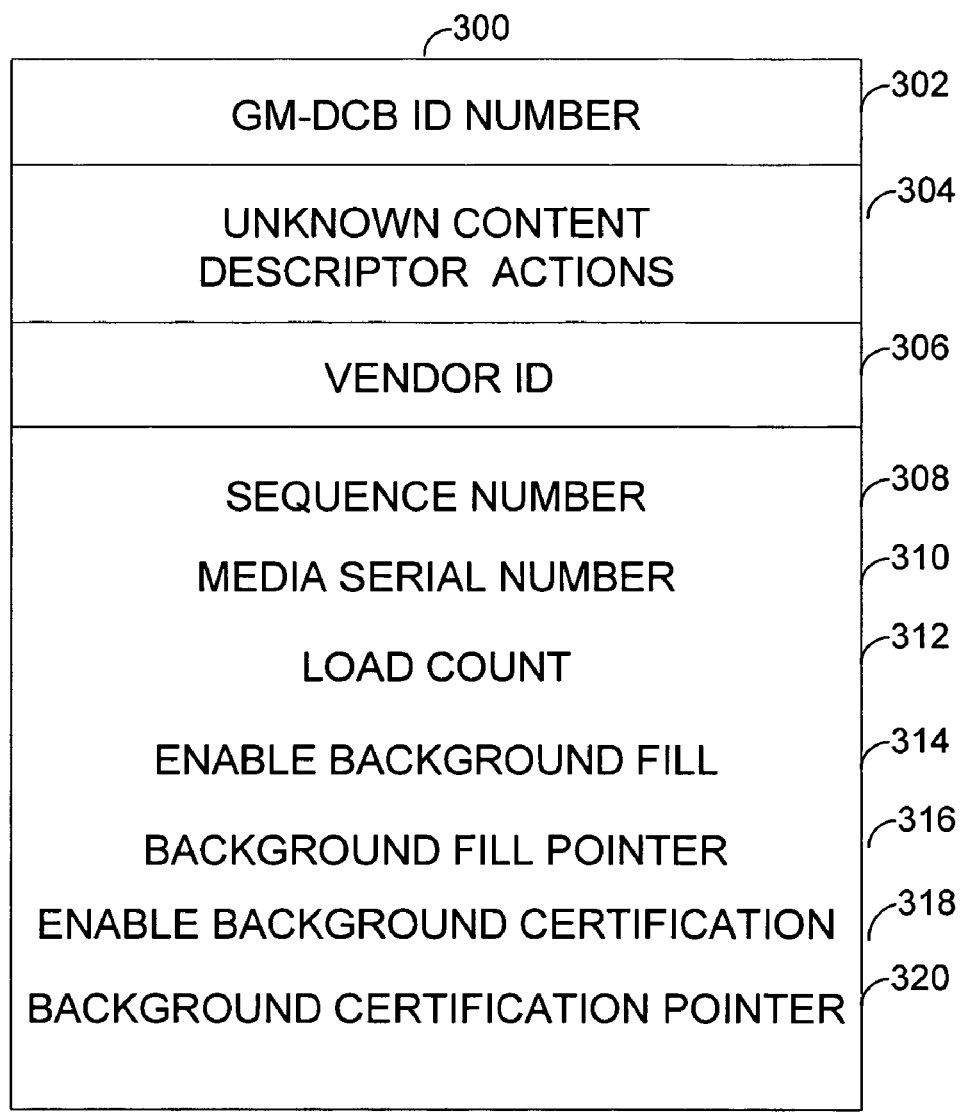
FIG. 3 is a block diagram of a General Media Disk Control Block in accordance with the invention.

FIG. 3 illustrates additional detail for the GM DCB (300). The GM DCB of course has the standard header (302, 304, 306). The following list of entries in the GM DCB specific area are intended as illustrations, and the actual list and order may change as the standard is defined. In the GM DCB-specific area illustrated in FIG. 3, the first example entry 308 is a sequence number. The sequence number is used for recovery from corrupted data or a power failure, and will be discussed in more detail below. The second example entry 310 in the GM DCB specific area is a media serial number. The third example entry 312 is a load count, which indicates the number of times the medium has been inserted into a drive. Optical disks envisioned for use in conjunction with the invention may contain up to approximately 17 Gigabytes of data. It is expensive, if not impractical, to preformat every medium. Accordingly, each medium may be formatted by a drive. It is known for optical disk formatting to occur as a background activity when a drive is otherwise idle. The fourth example parameter (314) for a GM DCB is a parameter that enables background fill (formatting). The next example parameter (316) is a pointer to the next block that has not been formatted. The drive may also check for media defects (certification) in the background by performing a read operation on each block after it has been formatted (or perhaps a real-time read-after write operation). The sixth example parameter (318) for a GM DCB is a parameter that enables background media certification. The seventh (320) example parameter is a pointer to the next block that has not been certified.

Some present optical disk technologies require that the laser writing power be calibrated before writing can occur. In general, the power required is a function of the specific medium and the particular electronic components in the drive. In general, power calibration is time consuming. Another proposed variable (not illustrated) in the GM DCB is at least one entry for a drive identification and a number designating the laser power resulting when the laser power was calibrated using the specific medium in the identified drive. A drive recognizing its own ID in the GM-DCB can then simply read the required laser power without having to recalibrate.

Operating systems may control whether or not a file can be read or written by a user. Some files may be password protected by the operating system. Alternatively, write protect for an entire medium may be controlled mechanically. For example, a sliding tab on a flexible disk cartridge, or a ring inserted into a tape reel may be used to prevent writing to a medium. In general, if an interchangeable medium is placed into a computer system using an incompatible operating system, access control specified by the operating system may be bypassed. For example, if one operating system write protects a file, a different operating system may permit the file to be overwritten. Moving control of access into the drive provides some additional protection. Access control within a drive is not new. For example, U.S. Pat. No. 5,233,576 (Curtis et al.) describes an optical disk medium in which the medium can be partitioned into different portions, and each portion can be defined as writable, or read-only. One attractive feature of Curtis et al. is that the method of write protection works even for legacy drives that were manufactured before the new access control method was available. One example DCB for use by the present invention takes this general concept even further. One example optional DCB is an Access Control (AC) DCB. An access control DCB divides the disk into regions, by specifying starting and ending logical block address or by specifying starting block address and number of blocks. Each region, as seen by the operating system, may represent a file, a directory, the entire disk, or any other logical storage construct. Each region has an associated access control specification, where the access control specifications include the following, as examples:

No restrictions
No read
No write
No format
Write-once
Read with password
Write with password
Format with password
Appendable with password The above list is just a list of examples, and other access controls may be desirable. For example, one issue is whether a control attribute specifying a write-once region can ever be reversed. The proposed standard specifies that controls can be changed, so there are controls on controls. For example, an access control, within a AC DCB, may itself be password protected.

Now return to the UCDA (FIG. 2, 204). The UCDA contains single bit fields, where each bit specifies an access control attribute. The UCDA is used only when a drive does not recognize a DCB ID, and therefore cannot interpret any information, or specifically cannot interpret access control information within the DCB-specific area of the DCB. When a drive does not recognize a DCB ID, the UCDA for the unrecognized DCB overrides all other access controls in all DCB's. For example, assume a newly defined DCB specifies that a region of the disk must be write protected. The new DCB specifying a write protect region also has a bit set in its UCDA area that specifies no writing. If the drive does not recognize the new DCB ID, the drive still sees that the UCDA specifies no writing, and the drive then does not permit any part of the disk to be written. This ensures that the drive does not perform any access activity that is inconsistent with the access requirements of an unrecognized DCB. For an additional example, a unknown DCB may disable reading of the DCB specific area of the DCB to ensure that a password in the DCB cannot be read by unauthorized drives. Specific UCDA bits may, for example, disable writing within the DCB area of the lead-in and lead-out areas, disable writing with the data area of the disk, disable writing to any part of the disk, disable overwriting of the data area, disable reformatting, disable reading of the data area, and so forth.

Figure 4:
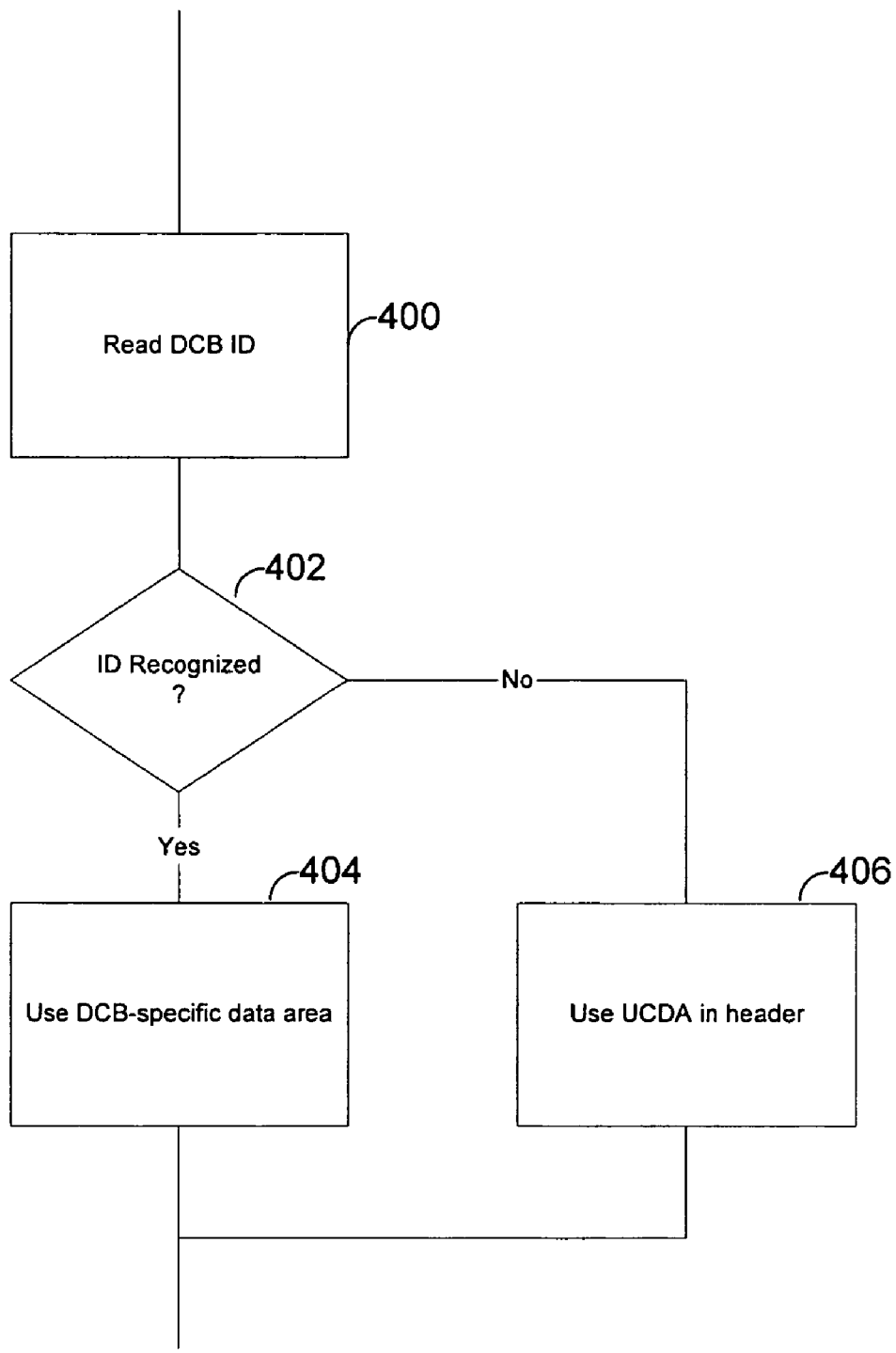
FIG. 4 is a flow diagram of a method for using unknown Disk Control Blocks.

FIG. 4 illustrates a method for use with the UCDA. A drive first reads the DCB ID (step 400). If the drive recognizes the ID (step 402), then the drive uses the DCB-specific data area (step 404). If the ID is not recognized (step 402), the drive must use the UCDA access control information in the header (step 406).

Another proposed DCB type is a firmware update DCB. Typically, drive firmware is updated by connecting a drive to a computer and having the computer send a new version of firmware. Often, it is more convenient if a firmware update can occur without involvement by a host computer. It is known for a drive to recognize a special medium having a new version of firmware for the drive. The drive replaces its existing firmware with the new firmware read from the special medium. A DCB may be defined that identifies a medium as a firmware update medium, and contains information describing the firmware update, version information, back version compatibility, and so forth.

Since DCB's are so critical to the proposed standard, it is important to provide some protection against a loss-of-power during writing of a DCB, or protection against some other corruption of a DCB. As stated above, one redundant DCB is written for each DCB. The first word of each DCB-specific data area is a sequence number (FIG. 3, 308). For example, when a DCB is written for the first time, it might have a sequence number of one. Each copy of the DCB receives the same sequence number. If the DCB is subsequently updated, the sequence number is incremented. Assume, for example, that a DCB having a sequence number of two is written into the lead-in area, and then power is lost while writing the copy in the lead-out area.

Figure 5:
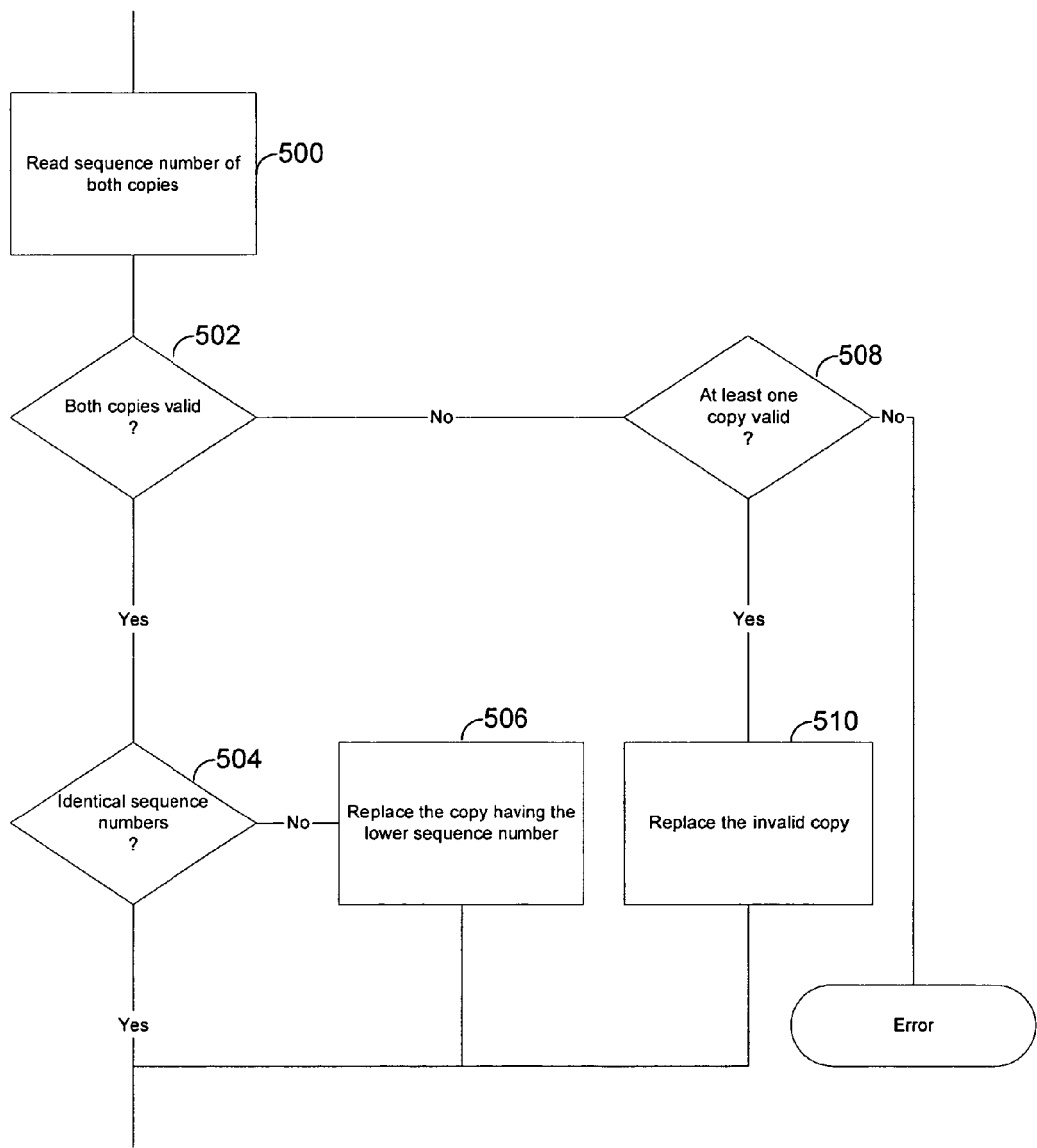
FIG. 5 is a flow diagram of a process for recovery from power-failure or data corruption in accordance with the invention.

FIG. 5 illustrates a method of ensuring that there are always two valid copies of each DCB. A drive can check DCB validity by checking the block error correction data. If both blocks are valid (FIG. 5, step 502), and if both sequence numbers are the same (step 504), then no remedial action is required. If both blocks are valid (step 502), but the sequence numbers are different (step 504), then power may have been interrupted before a copy could be made. The copy having the lower sequence number is then replaced by the copy having the higher sequence number (step 506). If at least one copy is not valid (step 502), but at least one copy is valid (step 508), then the invalid copy is replaced by the valid copy (step 510). If both copies are invalid (step 508), then an error condition has occurred, and automatic remedial action is not possible.

From the above, it can be seen that DCB's provide a flexible and standard way of providing administration and control information for a data storage medium, particularly when drives and media may be provided my many different manufacturers. In addition, the use of UCDA's provides a standard way of ensuring that a drive does not perform an access that is inconsistent with a DCB, even if the DCB is not recognized. Finally, redundancy and sequence numbers provide some protection against corrupted DCB's.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A data storage medium for being accessed by a drive, said data storage medium comprising:
   a control data structure including identification information;
   first control bits provided for use by the drive when the identification information included in said control data structure is recognized by the drive; and
   second control bits provided for use by the drive when the identification information included in said control data structure is not recognized by the drive.

2. The data storage medium of claim 1, wherein said second control bits contain single bit fields, and wherein each of the single bit fields specifies an access control attribute.

3. The data storage medium of claim 2 wherein the access control attribute precludes a read.

4. The data storage medium of claim 2 wherein the access control attribute precludes a write.

5. The data storage medium of claim 2 wherein the access control attribute specifies read with password.

6. The data storage medium of claim 2 wherein the access control attribute specifies write with password.

7. The data storage medium of claim 2 wherein the access control attribute specifies format with password.

8. The data storage medium of claim 2 wherein the access control attribute specifies appendable with password.

* * * * *